Figure 1:
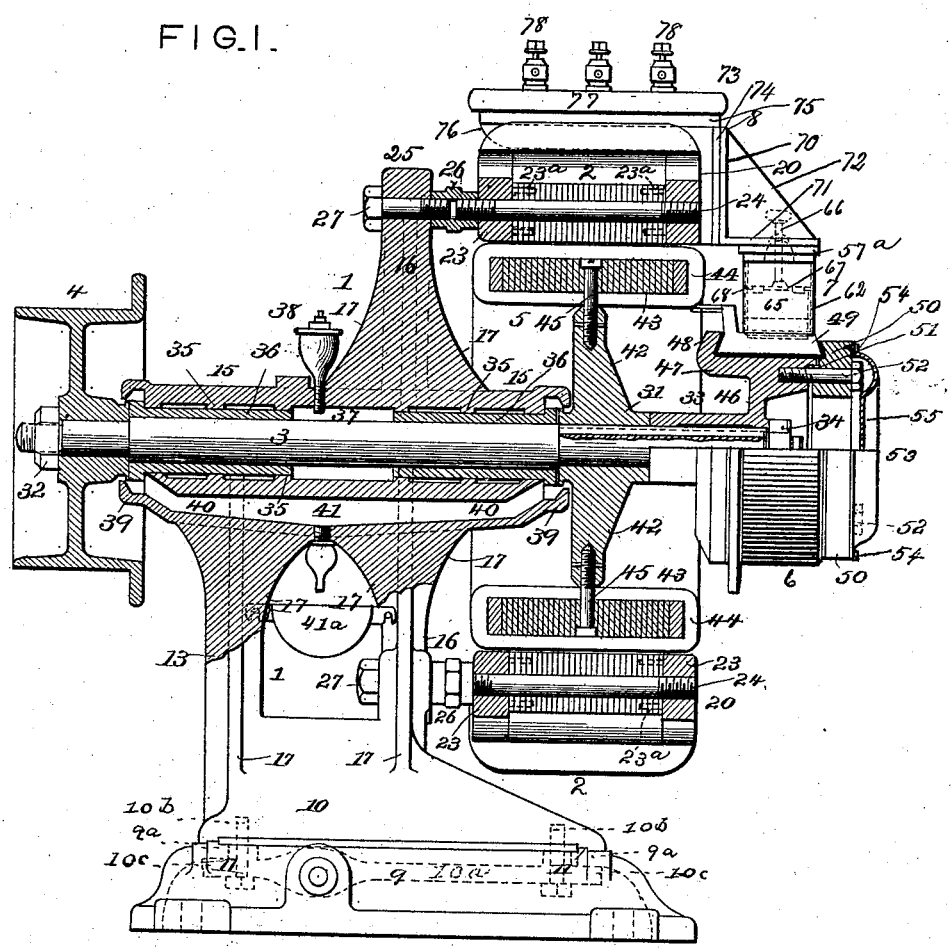
Figure 11:
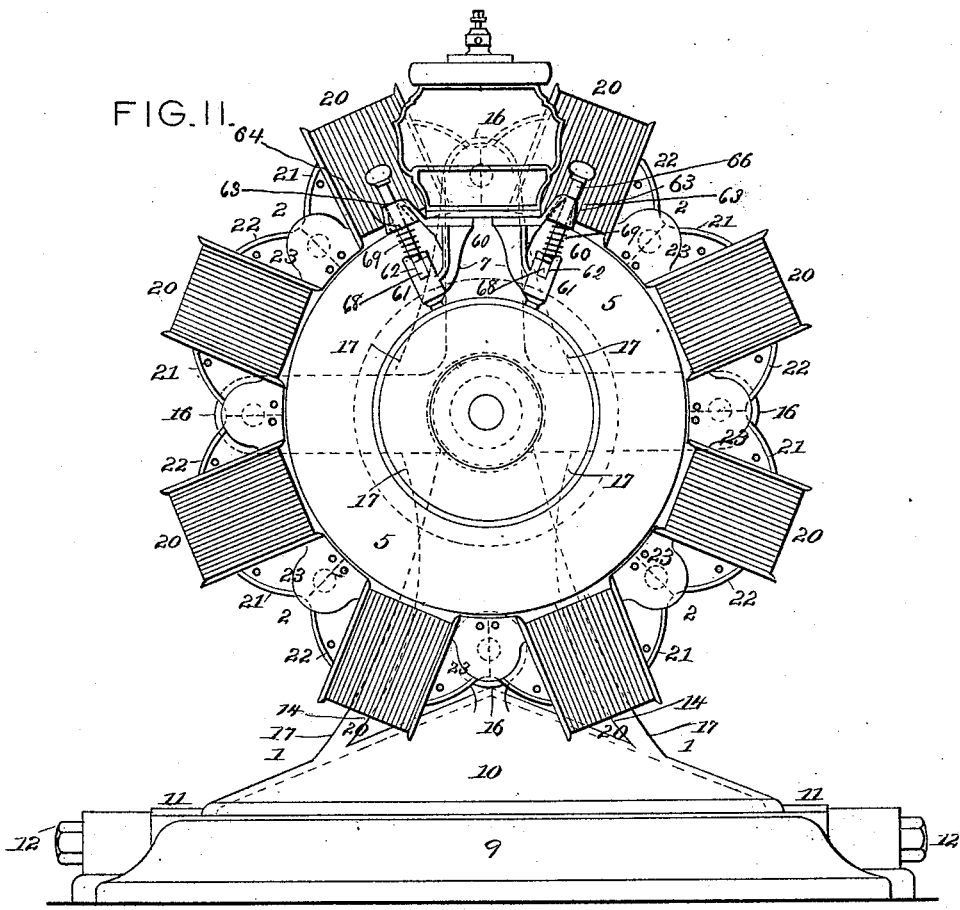

(No Model.) 2 Sheets—Sheet 1.

W. BAXTER, Jr.
ELECTRIC MOTOR OR GENERATOR.

No. 519,281. Patented May 1, 1894.

Witnesses:
Harry S. Rohrer
Octavius Knight

Inventor:
Wm Baxter Jr.
By Hervey S. Knight
Attorney.

THE NATIONAL LITHOGRAPHING COMPANY,
WASHINGTON, D. C.

(No Model.) 2 Sheets—Sheet 2.

W. BAXTER, Jr.
ELECTRIC MOTOR OR GENERATOR.

No. 519,281. Patented May 1, 1894.

Witnesses:
Harry S. Rohrer
Octavius Knight

Inventor:
W<sup>m</sup> Baxter Jr.
By Hervey S. Knight
Attorney

UNITED STATES PATENT OFFICE.

WILLIAM BAXTER, JR., OF BALTIMORE, MARYLAND.

ELECTRIC MOTOR OR GENERATOR.

SPECIFICATION forming part of Letters Patent No. 519,281, dated May 1, 1894.

Application filed May 12, 1891. Renewed October 18, 1893. Serial No. 488,548. (No model.)

*To all whom it may concern:*

Be it known that I, WILLIAM BAXTER, Jr., a citizen of the United States, residing at Baltimore, State of Maryland, have invented certain new and useful Improvements in Electric Motors, of which the following is a specification.

My improvements are designed more particularly for stationary motors though they are also applicable to electric generators and my improvements have for their objects to produce a simpler and more economical structure and a more efficient machine.

In the construction of that class of electrical machines to which my invention relates it is very desirable to have the field magnets so constructed as to make the most economical disposition of the lines of force. For this purpose I have adopted the multipolar type, thereby reducing the length of magnetic circuits. In order to reduce the longitudinal dimensions of the machine, I so construct the magnets and connect them that an annular series of eight magnets is formed having the adjacent poles of like polarity and connected together, with all the poles and windings in the vertical plane of the armature. In order to provide a neat and economical support for the field magnets in their vertical position, a four-armed spider is constructed, on one side of which the field magnets are secured by bolts passed through the extremities of the spider arms. The magnets are connected together by face plates which may be screwed or riveted together, although it is more desirable to use screws, especially at the poles which are connected to the ends of the spider-arms. The screw rods are connected by means of sleeves to the bolts above mentioned for the purpose of supporting the field magnets on the spider. These sleeves are preferably made of non-magnetic metal for the purpose of preventing leakage of the lines of force but iron sleeves would answer the purpose. The field magnets being supported from one side, the outer portion of the machine is left unobstructed by any frame or support, and the commutator is readily accommodated in close proximity to the armature. The bearing for the shaft is situated to one side of the armature and it is therefore an elongated one and adapted to keep the shaft from having any lateral play. The shaft being so well supported, the armature rotates very closely to the field magnets with safety. The bearing has means for collecting oil which escapes from the ends, and conveying it away to a waste cup. The pulley is carried on the end opposite to the armature and tends to produce a balanced effect. In order to support the bearing at the proper height, one end passes centrally through the spider, and the other end is supported by a standard. The standard and spider extend upward from a suitable base which is adjustable in a direction transversely to the shaft, to afford means for tightening the belt on the pulley.

My invention consists in certain novel features in the construction of the respective parts of an electric motor or dynamo-electric machine which will be hereinafter particularly pointed out in the claims, being first fully described with reference to the accompanying drawings, in which—

Figure I is a partially vertical axial section, of a machine embodying the improvements, and Fig. II is a front elevation of the same.

The machine consists of a suitable frame 1; field magnets 2 supported on the frame; a shaft 3, journaled in the frame concentrically with the field magnets and having a power pulley 4; an armature 5 and a commutator 6 fixed to the shaft, 3; and brush holders 7 mounted on a suitable bracket 8 supported from the field magnets 2. The frame, which rests on a suitable cast metal bed 9, consists of a pyramidal or otherwise suitably formed base 10, guided by a track 11 on the bed and adapted to be moved by adjusting screws 12; a standard 13, extending upward from base 10; a bearing or shaft-box 15; and a four-arm field-magnet supporting spider 16. The standard 13, shaft box 15, and spider 16 may all be constructed of cast-metal and provided with suitable transverse strengthening webs 17. The said parts may be made integral or they may be divided in two or more parts. In order to secure the base to the bed, a cross-bar 10ᵃ is secured by screws 10ᵇ to the under side of the base and projecting ends 10ᶜ of said bar are made to engage beneath shoulders 9ª of the bed. A suitably threaded perforation in the cross bar 10ª adapts it to serve as the nut for the feed screw 12.

The field magnets 2 consist of an annular series of eight symmetrically arranged magnets 20 the adjacent poles 21, 22, of which are of like polarity and connected together by the integral polar face-plates 23 and suitable screw-rods or rivets 24. The face plates 23 are provided with dowel pins 23ª which engage in holes in the sides of the poles of the magnets so as to firmly lock the poles in position and prevent shifting. In this way I do not depend wholly on the pressure between the face plates and force imposed by screws 24 for holding the magnets in position but rely also upon the dowel pins 23ª. The field magnets 2 are supported at the extremities of the spider-arms 25 by means of said screw-rods 24 and interposed screw-threaded sleeves 26 which receive screw-threaded bolts 27 passed through said spider-arms 25. The magnets' cores may be made of laminæ or thin plates, as described and claimed in an application heretofore filed by me and serially numbered 392,517 and the screw-rods 24 are screwed into the outer face-plates between the poles, while the inner plates are held rigidly and the meeting poles tightly clamped by means of the screw threaded sleeves 26. At the poles which come between the spider arms, the plates are held by placing nuts on the outside of the screw rods in place of the sleeves 26. The object of the piece 26 is to keep the field magnets and armature away from the body of the spider and prevent magnetic leakage. It may therefore be a sleeve of non-magnetic or other material, or it may be a lug or projection formed on the spider, or the end of the spider arms in any suitable manner.

The shaft 3 has an elongated bearing in box 15 and carries the pulley 4, retained by a nut 32, at one end, and the armature 5 and commutator 6 keyed and secured by a nut 34 at the other. The armature hub 31 abuts against the forward end of the box 15, and the pulley 4 abuts against the opposite end of said box so that the shaft is kept from movement longitudinally.

The commutator has an elongated hub 33 which abuts and is held against the armature by the nut 34. The shaft-box or bearing 15 has a central bore in which are annular ribs 35 for supporting the bushings 36 which are inserted from the opposite ends. These bushings are of such length as to leave a central oil chamber 37 into which oil is introduced through a receiving-cup 38. Guard-flanges 39 formed on the box surround the inner peripheries of the hubs of the pulley and armature and catch all oil which escapes from the shaft-box. A longitudinal passage 40 located beneath the bearing and inclined both ways toward the center, receives the oil collected by the flanges 39 and from the lowest point of said passage the oil passes off through a passage 41 into a drip-cup 41ª.

The armature comprises a spider 42 a laminated ring 43 and winding 44 constructed substantially like corresponding parts of the armature described and claimed in my application above referred to. The ring is secured to the spider arms by bolts 45 passed through the ring and screwed into the ends of said arms. The armature is held very rigidly in its place by the elongated bearing in which the shaft is mounted, and it can therefore be rotated with safety within very close proximity to the annular field.

The commutator comprises an elongated hub 33, a web 46 and an annular collar 47 having an undercut flange 48. The commutator plates 49 are retained by said undercut flange 48 and the annular retaining ring 50 which is secured to the collar by means of screws 52. A shoulder 51 on the ring engaging under a corresponding shoulder on the collar 47 causes the ring to be accurately centered and prevents displacement which is apt to result from unequal shrinkage or compression of different parts of the insulation around the commutator plates, as set forth in my aforesaid application.

53 represents a guard plate or disk secured to the ring 50 by screws 54, so as to cover the end of the shaft and the screws 52 and prevent anything coming in contact therewith. The guard plate has an annular depression 55, to accommodate the heads of the screws 52.

The brush holder 7 consists of a pair of hangers 60 bolted or screwed to the under side of bracket 8 and having lower sockets 61 with side slots 62, and upper guide sleeves 63 with flaring openings 64. Carbon or other suitable brushes 65 are fitted so as to be vertically movable in sockets 61. Presser-rods 66 working in the upper sleeves 63, have channeled or grooved cross-heads 67 which fit over the brushes and terminate in lateral extensions 68 which work in and are guided by the side slots 62 of the sockets 61. Springs 69 located between the upper sleeve 63 and cross-head 67 serve to force the presser-rods downward and keep the brushes always in contact with the commutator plates. In order to replace the carbon brushes, it is simply necessary to withdraw the cross-head from the slots by raising the presser-bar and deflect the rod to one side until the cross-head rests upon the side of the socket, take out the brushes and insert new ones and then shift the rod back until the cross-head snaps into place.

The bracket 8 consists of the wall plate 70, the sole 71 and the rib 72, the hangers being secured to the under side of the sole. The additional bracket 73 having the wall plate 74, sole 75 and flange 76, supports a board 77 upon which board are mounted the binding posts 78. The sole 75 of bracket 73 rests in the crotch between two poles. The wall plates of the two brackets are secured together and upon the face plate of the field.

Having thus described my invention, the following is what I claim as new therein and desire to secure by Letters Patent:

1. In a dynamo or motor the combination of the bed, having a suitable track, a sliding base adapted to said track, means for holding the base to the bed, set screws carried by one of said parts and engaging the other, the vertical standard and spider, the bearing carried by said standard and spider, the shaft journaled in said bearing, the pulley, armature and commutator fixed to the shaft, and the field magnets supported on the spider, substantially as and for the purpose set forth.

2. In an electrical machine of the character stated, the combination of the base, the standard and spider, extending from the base, the bearing supported upon said standard and spider, the shaft journaled in the bearing and carrying the pulley, armature and commutator, and the field magnets supported on the spider, substantially as set forth.

3. The combination of the spider, having the projections 26 on the arms of said spider, and the field magnets supported on the spider through the medium of said projections, substantially as and for the purpose set forth.

4. An electric motor or dynamo-electric machine having the field magnets composed of an annular series of symmetrically arranged magnets whose poles and windings lie in the vertical plane of the armature, and whose adjacent poles are of like polarity and connected together by the integral polar face-plates, substantially as and for the purpose set forth.

5. An electric motor or dynamo-electric machine having the field magnets composed of an annular series of magnets whose adjacent poles are of like polarity and connected together by the polar face-plates 23 and suitable screws or rivets 24, and held against shifting by dowel-pins 23ª, substantially as explained.

6. The combination of the base, the vertical supports, the bearing on said supports, the field magnets also supported from the base, the shaft journaled in the bearing, and the pulley and the armature on said shaft on opposite sides of the bearing and abutting against the bearing to prevent longitudinal movement of the shaft, substantially as explained.

7. The combination with the frame, the shaft, the field magnets supported on the frame, and the armature supported on the shaft; of the commutator consisting of the collar, the plates, the securing ring held by screws on said collar, and the disk or cap placed over the end of said commutator and the end of the shaft, substantially as set forth.

8. The combination of the frame, the field magnets mounted on the frame, the shaft journaled in the frame, the armature and commutator secured to the shaft, the bracket secured to the field magnets, and the hanger secured to the bracket, and carrying the brushes, substantially as set forth.

9. The combination of the frame, the field magnets supported on the frame, the shaft journaled in the frame, the armature and commutator secured to the shaft, the bracket secured to the field magnets, the board resting between the poles, and carrying the binding posts and the hangers extending downward from the bracket and carrying the brushes, substantially as and for the purpose set forth.

WILLIAM BAXTER, JR.

Witnesses:
WM. ELLIS COALE,
ISAAC COALE, Jr.